Feb. 20, 1940.    J. W. LEIGHTON    2,190,719
HYDRAULIC BRAKE CYLINDER
Filed March 2, 1936
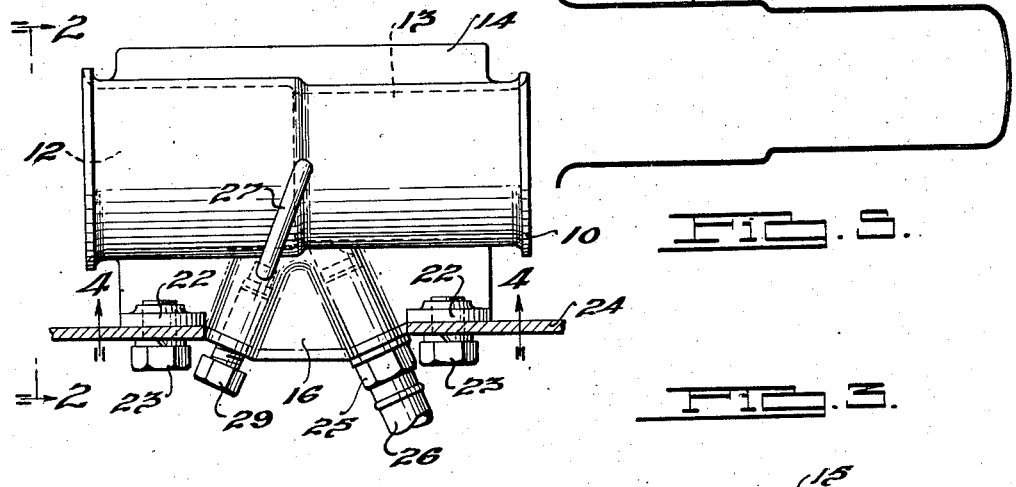
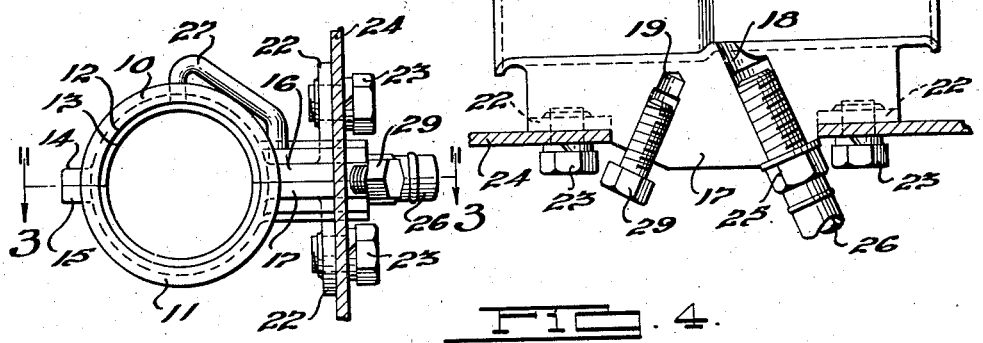
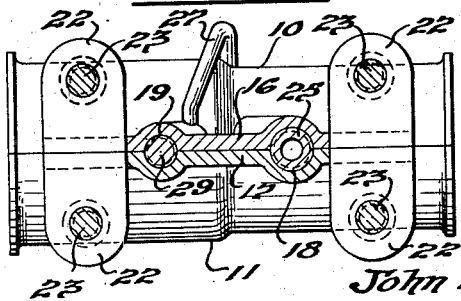
INVENTOR
John W. Leighton.
BY
Harness, Dickey, Pierce & Hann
ATTORNEYS.

Patented Feb. 20, 1940

2,190,719

UNITED STATES PATENT OFFICE 2,190,719

HYDRAULIC BRAKE CYLINDER

John W. Leighton, Port Huron, Mich.

Application March 2, 1936, Serial No. 66,517

3 Claims. (Cl. 309—2)

This invention relates to hydraulic brake cylinder constructions. More particularly, it relates to an improved form of hydraulic brake cylinder construction, composed substantially entirely of sheet metal parts secured together to provide a unitary integral construction.

It is a primary object of the present invention to provide a brake cylinder construction formed substantially entirely of sheet metal in which the fluid supply port and the bleed port are disposed in material angles to the axis of the cylinder in order that easy access may be had thereto.

Still another object of the present invention consists in the provision of a brake cylinder construction comprising a pair of substantially symmetrical preformed sheet metal stampings secured together face to face and providing therebetween the brake cylinder and the fluid supply port communicating therewith.

The invention further contemplates the provision of means associated with the mating flanges of the sheet metal stampings forming the cylinder construction for securing the same in predetermined position upon a brake housing with which the cylinder is associated.

Yet another object of the present invention consists in the provision of a pair of mating grooves in the mating flanges of the sheet metal parts forming the improved brake cylinder construction, which together serve to provide a deadend duct having an auxiliary pipe communicating therewith and with the cylinder proper, in order to provide novel and effective means for bleeding air from the cylinder at the time fluid is introduced thereinto.

Many other and further objects and advantages of the present invention will become apparent from the following specification when considered in connection with the accompanying drawing forming a part thereof.

In the drawing:

Figure 1 is a top plan view of one form of the improved brake cylinder construction illustrating the same mounted upon a brake housing structure;

Fig. 2 is an end elevational view of the improved hydraulic brake cylinder construction, taken substantially on the line 2—2 of Fig. 1;

Fig. 3 is a horizontal, sectional view, taken substantially on the line 3—3 of Fig. 2, illustrating the interior construction of the brake cylinder and the manner in which the fluid supply port communicates therewith;

Fig. 4 is a vertical, sectional view, taken substantially on the line 4—4 of Fig. 1, illustrating in detail the manner in which the improved brake cylinder construction is mounted on the brake housing with which it is associated and showing the location of the ports communicating therewith;

Fig. 5 illustrates a length of copper wire bent to the form utilized for welding the sections together.

With more particular reference to the specific embodiment of the invention illustrated in the drawing, it will be seen that the improved hydraulic brake cylinder construction comprises a pair of mating sheet metal stampings, generally designated 10 and 11, which are secured together face to face. It has been found essential in the provision of hydraulic brake cylinder constructions of this general type to provide a pair of coaxially arranged cylinders of slightly different diameter, each of which is adapted to receive a piston connected to one end of the brake shoe which the cylinder serves to operate. This construction has been found desirable due to the fact that the direction of rotation of the wheel requires a greater mechanical advantage upon one end of the brake shoe than upon the other due to the wrapping effect of the brake shoe on the brake drum with which it is associated. In order to obtain a brake cylinder construction having the characteristics outlined above, the sheet metal members 10 and 11 are each provided with semi-cylindrical coaxially disposed depressions 12 and 13 of slightly different diameter, such that when the blanks 10 and 11 are arranged in face to face relation, the resulting structure will provide a pair of coaxially disposed cylinders of slightly different diameter.

The blank 10 is provided in one of its side edges with an axially extending flange 14 which mates with a corresponding axially extending flange 15 formed on the stamping 11. On the opposite side of the cylinder construction the stamping 10 is provided with a relatively wide laterally extending flange 16 which is adapted to mate in face to face relation with a corresponding relatively wide flange 17 formed in the sheet metal member 11. At the time the semicylindrical depressions 12 and 13 are formed in these stampings 10 and 11, a pair of angularly disposed grooves 18 and 19 are formed in each of the flanges 16 and 17. It will be clearly seen by reference to Figure 3 that the grooves 18 mate to provide a duct communicating with the interior of the cylinder structure formed by the stampings and it will further be apparent, due to the semi-cylindrical configuration of the grooves from which this duct is formed, that when the stampings are placed together in face to face relation, the resulting duct structure will be substantially cylindrical in form.

The grooves 19 are likewise semi-cylindrical in configuration and it will be seen by reference to Figure 3 that these grooves terminate short of the cylinder structure and consequently provide a dead-end duct, the purpose and function of which will hereinafter become clear.

A pair of lugs are preferably provided on each of the flanges 16 and 17 and it will be seen by reference to Figure 4 that these lugs 22 provide satisfactory means for securing the brake cylinder construction to the brake housing with which it is associated. The lugs 22 are preferably provided with an internally threaded aperture adapted to receive bolts 23 which extend through the wall of the brake housing structure 24 on which the hydraulic brake cylinder is to be mounted and secure the entire hydraulic brake cylinder assembly permanently in position thereon. The brake housing structure 24 is preferably provided with an aperture of configuration such that it will permit the mating portions of the flanges 16 and 17 to extend therethrough in order that access may be had to the open end of the ducts 18 and 19.

The duct 18 is internally threaded and is adapted to receive a fluid supply fitting 25 which serves to connect a supply conduit 26 through which fluid from the master cylinder which serves to actuate the brake may be supplied to the interior of the cylinder construction of the present invention.

It will be noted that the axes of the ducts formed by the mating grooves 18 and 19 are not only substantially inclined to each other, but are substantially inclined to the axis of the cylinder. Thus the outer ends of the ducts are inherently spaced apart rather widely and hence easy access may be had thereto. As is conventional in structures of this general character, the king pin which serves to support the wheel generally, passes the axial central portion of the cylinder and hence it is particularly desirable that the openings of the ducts be located in spaced relation to the axial central portion of the cylinder.

The sheet metal stampings 10 and 11 may be secured together by copper welding in order to provide a substantially integral unitary construction and after the welding operation has been completed, the interior of the cylinders 12 and 13 may be diamond bored to provide a smooth cylindrical interior surface therein.

It has been found particularly desirable to utilize copper welding for the purpose of securing the members 10 and 11 together and the present invention contemplates a particularly novel method for performing this operation. A wire 30 of copper is bent to substantially the configuration shown in Figure 5 and after the sections 10 and 11 have been assembled in face to face relation this U-shaped wire is inserted in the cylinder formed therebetween and due to its inherent resiliency it will spring outwardly against the walls thereof thus retaining itself seated in place. The wire 30 may be positioned so that it will be closely adjacent the joint and the whole may then be heated in an inert atmosphere and the copper from the wire will flow into the joint securing the parts together.

A suitable hole may be drilled in the upper surface of the stamping 10 to provide a bleed port at the upper portion of the cylinder construction. Likewise a suitable aperture is provided in the flange 16 providing communication with the inner end of the duct 19 and a suitable tube or conduit 27 may be welded in position substantially as is shown in Figure 2 establishing communication between this duct 19 and a suitable point on the upper surface of the cylinder. The duct 19 is preferably also internally threaded and may be closed by means of a suitable plug or bolt 29.

It will be readily apparent that when fluid is introduced into the cylinders 12 and 13 by means of the fluid supply line 26 and duct 18 with which it communicates, air may be bled from the interior of the cylinders 12 and 13 by means of the conduit 27 and bleed duct 19. Due to the fact that this conduit 27 communicates with the top portion of the cylinder construction, it will be seen that this conduit may be utilized for the purpose of straining off all of the air within the system during the time the fluid is being introduced into the interior of the cylinder construction.

While but one specific embodiment of the invention has been illustrated and described, it will be clearly apparent that many other and further modifications may be made. The scope of the invention is defined in the following appended claims.

I claim as my invention:

1. A hydraulic brake cylinder construction comprising a pair of sheet metal stampings each having a semi-cylindrical depression therein and flanges at the lateral sides of said depression, a groove in one of the flanges of each of said stampings, said stampings being secured together face to face whereby said depressions mate to form a cylinder, and said grooves mate to form a port communicating with said cylinder, and lugs on said flanges providing means for mounting said cylinder.

2. In a hydraulic brake cylinder assembly, a pair of sheet metal stampings preformed to provide a cylinder therebetween, said stampings also providing therebetween a fluid supply port communicating directly with the interior of said cylinder and a dead-end bleed port and a conduit connecting said dead-end port with said cylinder.

3. A hydraulic brake cylinder construction comprising a pair of sheet metal stampings, each having a pair of co-axially arranged semi-cylindrical depressions therein and each having flanges at the lateral sides of said depressions, a groove in one of the flanges of each of said stampings, said stampings being secured together face-to-face whereby said depressions mate to form a pair of co-axially disposed cylinders and said grooves mate to form a port communicating with said cylinders.

JOHN W. LEIGHTON.